(12) United States Patent
Mauro et al.

(10) Patent No.: US 7,517,009 B2
(45) Date of Patent: Apr. 14, 2009

(54) DUAL RELEASE HEADREST

(75) Inventors: Andre Mauro, Farmington Hills, MI (US); David Karl Williams, South Lyon, MI (US); Eric A. Woods, Allen Park, MI (US); Michael Ferrari, St. Clair Shores, MI (US); Mark Allyn Folkert, Farmington Hills, MI (US); Syed Z. Haider, Canton, MI (US); Alan Daniel Novrocki, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 232 days.

(21) Appl. No.: 11/470,384

(22) Filed: Sep. 6, 2006

(65) Prior Publication Data

US 2008/0073963 A1  Mar. 27, 2008

(51) Int. Cl.
*A47C 1/036* (2006.01)
*A47C 7/36* (2006.01)

(52) U.S. Cl. .................... 297/61; 297/408; 297/410

(58) Field of Classification Search .................. 297/61, 297/410, 408
See application file for complete search history.

(56) References Cited

U.S. PATENT DOCUMENTS

| 5,236,245 A | 8/1993 | Harrell |
|---|---|---|
| 5,288,129 A | 2/1994 | Nemoto |
| 5,362,129 A | 11/1994 | Itoh et al. |
| 5,681,088 A | 10/1997 | Takei |
| 6,007,154 A | 12/1999 | Parker |
| 7,008,019 B2 | 3/2006 | Lampke |
| 7,044,555 B2 | 5/2006 | Saberan |
| 7,059,681 B2 * | 6/2006 | Kubo ................ 297/410 X |
| 2004/0245834 A1 | 12/2004 | Schmitt et al. |

FOREIGN PATENT DOCUMENTS

| DE | 19716054 C1 | 9/1998 |
|---|---|---|
| DE | 102004027384 | 12/2005 |
| DE | 102005005826 | 8/2006 |
| FR | 2879141 | 6/2006 |
| FR | 2881693 | 8/2006 |
| JP | 2002272554 | 9/2002 |
| JP | 2004155269 | 6/2004 |

OTHER PUBLICATIONS

UK Intellectual Property Office, Combined Search and Examination Report Under Sections 17 and 18(3), Jan. 7, 2008, 8 pages.

* cited by examiner

*Primary Examiner*—Anthony D Barfield
(74) *Attorney, Agent, or Firm*—Brooks Kushman P.C.

(57) ABSTRACT

A headrest assembly in combination with a vehicle seat assembly, the combination including a vehicle seat assembly having a seat bottom and a seat back assembly connected to the seat bottom. The combination also includes a headrest assembly connected to the seat back assembly. The headrest assembly has a head receiving portion that is configured for movement between a first position and a second position with respect to the seat back assembly. The seat back assembly obstructs downward adjustment of the headrest assembly below a predetermined height when the head receiving portion is in the first position. The headrest assembly can be downwardly adjustable below the predetermined height when the head receiving portion is in the second position.

19 Claims, 4 Drawing Sheets

DUAL RELEASE HEADREST

BACKGROUND OF THE INVENTION

1. Field of the Invention

This invention relates to headrests.

2. Background Art

A headrest assembly is disclosed herein. Examples of headrest assemblies are disclosed in U.S. Pat. Nos. 7,044,555; 7,008,019; 6,007,154; 5,681,088; 5,362,129; 5,288,129; 5,236,245.

SUMMARY OF THE INVENTION

Under the invention, a new headrest assembly in combination with a vehicle seat assembly is provided. In a first embodiment, the combination comprises a vehicle seat assembly having a seat bottom, a seat back assembly connected to the seat bottom, and a headrest assembly connected to the seat back assembly. The headrest assembly has a head receiving portion that is configured for movement between a first position and a second position with respect to the seat back assembly. In at least this first embodiment, the seat back assembly obstructs downward adjustment of the headrest assembly below a predetermined height while the head receiving portion is in the first position. The headrest assembly can be downwardly adjusted below the predetermined height when the head receiving portion is in the second position.

In at least one implementation of the first embodiment, the head receiving portion rotates at least 60° when moving between the first position and the second position.

In a further implementation of the first embodiment, the seat back assembly obstructs the head receiving portion from returning to the first position while the headrest assembly is below the predetermined height.

In another implementation of the first embodiment, the headrest assembly further comprises a spring connected to the head receiving portion. The spring urges the head receiving portion towards the second position. The headrest assembly further comprises a first interlock assembly connected to the head receiving portion. In this implementation, the first interlock assembly is capable of locking the head receiving portion in the first position and the spring moves the head receiving portion to the second position and retains the head receiving portion in the second position whenever the head receiving portion is not locked in the first position by the first interlock assembly. In a variation of this implementation, the headrest assembly is adjustable up and down with respect to the seat back assembly and the combination further comprises a second interlock assembly attached to either the head rest assembly or the vehicle seat assembly that controls up and down adjustment of the headrest assembly.

In another implementation of the first embodiment, the seat back assembly can be folded down on top of the seat bottom. In this implementation, the seat back assembly further comprises a motion inducing member that at least partially moves the head receiving portion towards the first position as the seat back assembly is folded down. In a variation of this implementation, the vehicle seat assembly further comprises a cable attached to the motion inducing member to cause the motion inducing member to move as the seat back assembly is folded down.

In another implementation of the first embodiment, the first interlock assembly automatically locks the head receiving portion in the first position when the head receiving portion is moved to the first position.

In a second embodiment, a headrest assembly for use with a vehicle seat assembly is provided, the vehicle seat assembly having a seat bottom, a seat back assembly attached to the seat bottom, and the seat back assembly being adapted to receive the headrest assembly, the head rest assembly comprising a connecting post configured for connection to the seat back assembly, a head receiving portion connected to the connecting post and configured for movement with respect to the connecting post between an operational position and a non-operational position, a spring connected to the head receiving portion that urges the head receiving portion towards the non-operational position and a first interlock assembly associated with the head receiving portion for retaining the head receiving portion in the operational position. In this embodiment, the head receiving portion automatically moves towards the non-operational position when the first interlock assembly is released. Also, the head receiving portion is configured such that when the connecting post is received within the seat back assembly, and while the head receiving portion is in the operational position, the head receiving portion cooperates with the seat back assembly to inhibit downward adjustment below a predetermined height.

In at least one implementation of the second embodiment, when the connecting post is received within the seat back assembly and when the head receiving portion is in the non-operational position, and when the head rest assembly is below a predetermined height, the head receiving portion cooperates with the seat back assembly to inhibit the head receiving portion from returning to the operational position.

In at least another implementation of the second embodiment, the operational position and the non-operational position are separated by approximately 60° of rotation.

In at least another implementation of the second embodiment, the headrest assembly includes a second connecting post configured for connection to the seat back assembly and moveably connected to the head receiving portion.

In at least another implementation of the second embodiment, the interlock assembly automatically locks the head receiving portion in the operational position when the head receiving portion is moved into the operational position.

In a third embodiment, a headrest assembly in combination with a vehicle seat assembly is provided, the combination comprising a vehicle seat assembly having a seat bottom and a seat back assembly connected to the seat bottom. The seat back assembly has a longitudinal axis, a top portion and two cavities disposed along the top portion. The combination also includes a headrest assembly connected to the seat back assembly. The head rest assembly has a head receiving portion, two connecting posts, a connecting member, a first interlock assembly, and a spring. In this embodiment, the two connecting posts are received within the two cavities and the connecting member is connected to the two connecting posts in the proximity of the top portion of the two connecting posts. The head receiving portion is rotatably connected to the connecting member and is configured for movement with respect to the two connecting posts between an operational position and a non-operational position that is substantially out of alignment with the longitudinal axis of the seat back assembly. The first interlock assembly is connected to the headrest assembly and is configured to automatically lock the head receiving portion in the operational position whenever the head receiving portion is moved into the operational position. The first interlock assembly inhibits movement of the head receiving portion to the non-operational position. The spring is connected to the head receiving portion and urges the head receiving portion towards the non-operational position such that the head receiving portion moves automatically to the non-operational position and is retained in the non-operational position by the spring whenever the head receiving portion is not locked in the first position by the first interlock assembly. In this embodiment, the headrest assembly and the seat back assembly cooperate to inhibit the head rest assembly from being lowered to less than a predetermined distance from the seat bottom when measured along the longitudinal axis of the seat back assembly while the head receiving portion is in the operational position. The headrest assembly can be lowered to less than the predetermined distance from the seat bottom when the head receiving portion is in the non-operational position. In at least this embodiment, the head receiving portion is inhibited by the seat back assembly from returning to the operational position while the headrest assembly is less than the predetermined distance from the seat bottom.

In at least one implementation of the third embodiment, the first interlock assembly comprises a motion prevention member mounted to the head receiving portion and configured for movement with respect to the head receiving portion between an extended position and a retracted position. This implementation further comprises a motion prevention member spring that urges the motion prevention member towards the extended position. This implementation further comprises an obstruction member mounted to the connecting member. The obstruction member cooperates with the motion prevention member to inhibit movement of the head receiving portion from the operational position to the non-operational position when the motion prevention member is in the extended position. This implementation further comprises a release member mounted to the head receiving portion and configured for movement with respect to the head receiving portion between a fore position and an aft position. This implementation also comprises a release member spring that is mounted to the release member that urges the release member towards the aft position. In at least this implementation, the release member moves the motion prevention member to the retracted position when the release member is moved to the fore position. In at least this implementation, the obstruction member is dimensioned and positioned to allow the motion prevention member to move past the obstruction member when the motion prevention member is in the retracted position, thereby allowing the head receiving portion to move from the operational position to the non-operational position. The obstruction member further inhibits the motion prevention member from returning to the extended position while the head receiving portion is out of the operational position. Further, the motion prevention member spring causes the motion prevention member to return automatically to the extended position when the head receiving portion is returned to the operational position.

In at least another implementation of the third embodiment, the seat back assembly can be folded down to a position that is substantially parallel to the seat bottom. In at least this implementation, the seat back assembly further comprises a motion inducing member that urges the head receiving portion towards the operational position as the seat back assembly is folded down.

In at least another implementation of the third embodiment, the vehicle seat assembly further comprises a cable attached to the motion inducing member that causes the motion inducing member to move into contact with the head receiving portion as the seat back assembly is folded down, thereby urging the head receiving portion towards the operational position as the seat back assembly is folded down.

In at least another implementation of the third embodiment, the head rest assembly is adjustable with respect to the seat back assembly in a direction substantially parallel to the longitudinal axis of the seat back assembly between a maximum distance from the seat bottom and the predetermined distance from the seat bottom.

In at least another implementation of the third embodiment, the head receiving portion rotates about the connecting member at least 60° when moving between the operational position and the non-operational position. In at least one variation of this implementation, the headrest assembly further includes a rotation stopping member to inhibit the head receiving portion from rotating beyond 60° when moving from the operational position to the non-operational position.

DETAILED DESCRIPTION OF THE PREFERRED EMBODIMENT(S)

Reference will now be made in detail to the illustrated embodiments of the present invention which constitute the best modes of practicing the invention presently known to the inventors. The following descriptions are merely exemplary in nature and are in no way intended to limit the invention, its application, or uses. The figures are not necessarily drawn to scale. Therefore, specific details disclosed herein are not to be interpreted as limiting, but merely as a representative basis for any aspect of the invention and/or as a representative basis for teaching one skilled in the art to variously employ the present invention.

As best shown in FIGS. 1 through 5, at least one embodiment of the invention includes a combination 20 comprising a vehicle seat assembly 22 and a headrest assembly 24. In the illustrated embodiment, the vehicle seat assembly 22 comprises a seat bottom 26 and a seat back assembly 28. The seat back assembly 28 further comprises a cavity 30 (shown in phantom lines) to facilitate the mounting of headrest assembly 24. In this embodiment, headrest assembly 24 includes a head receiving portion 32 and a connecting post 34. Head receiving portion 32 can be cushioned and can prevent a vehicle occupant from incurring neck injuries during a rear end collision by catching the occupant's head as it moves rearward during a rear end collision. In the illustrated embodiment, the connecting post 34 extends into the cavity 30 of the vehicle seat back assembly 28. In the embodiment illustrated in FIGS. 1-5, the headrest assembly 24 can be adjusted upwardly and downwardly with respect to seat back assembly 28 to accommodate varying heights of different occupants. In this embodiment, the upward and downward adjustment of headrest assembly 24 is controlled by a second interlock assembly 36. In variations of the present invention, the headrest assembly may not be adjustable upwardly or downwardly, but rather, may simply move between a use and a storage position. In embodiments where upward and downward adjustment of headrest assembly 24 is possible, the second interlock assembly 36 can cooperate with notches on connecting post 34 to control adjustment of the headrest assembly 24. In the embodiment illustrated in FIGS. 1-5, the second interlock assembly 36 is illustrated as being part of the seat back. In other embodiments (now shown), the second interlock assembly 36 may be mounted to the headrest assembly 24 or other parts of the vehicle seat assembly 22 and may use any mechanism effective for controlling the upward and downward adjustment of headrest assembly 24.

Figure 1:
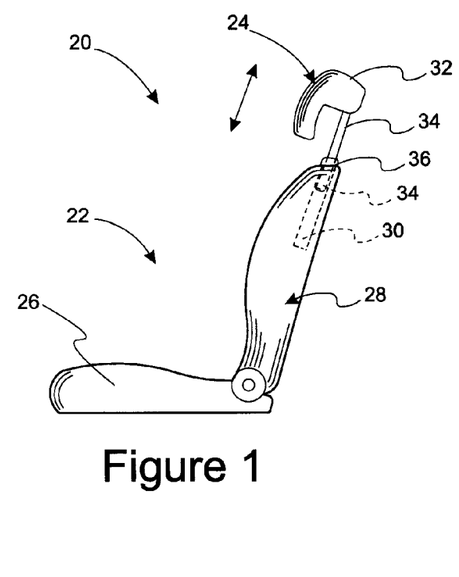
FIG. 1 is a side elevational view of an embodiment of the combination of the present invention with the head receiving portion in the first or operational position.
Figure 2:
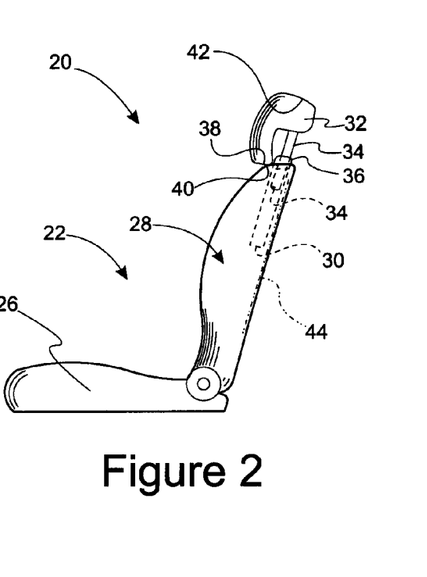
FIG. 2 is a side elevational view of the embodiment shown in FIG. 1 with the headrest assembly in the full down position.

As illustrated in FIG. 2, the headrest assembly 24 has been adjusted downwardly to the point where a bottom portion 38 of headrest assembly 24 contacts a top portion 40 of seat back assembly 28. In this embodiment, the top portion 40 of seat back assembly 28 obstructs further downward adjustment of headrest assembly 24. In other embodiments, other portions of seat back assembly 28 may contact bottom portion 38 of headrest assembly 24 to obstruct further downward adjustment of headrest assembly 24. In still other embodiments, the top portion 40 of seat back assembly 28 may make contact with other portions of headrest assembly 24 to obstruct further downward adjustment of headrest assembly 24. In still other embodiments, portions of seat back 28 other than top portion 40 may make contact with portions of headrest assembly 24 other than bottom portion 38 to obstruct further downward adjustment of headrest assembly 24. In at least one embodiment, when headrest assembly 24 has been adjusted downwardly to the point where further downward adjustment is not possible due to the obstruction caused by seat back assembly 28 (this position is referred to as the "full down" position), a top portion 42 of the headrest assembly 24 is at least 750 millimeters from seat bottom 26 when measured along the longitudinal axis 44 of seat back assembly 28.

Figure 3:
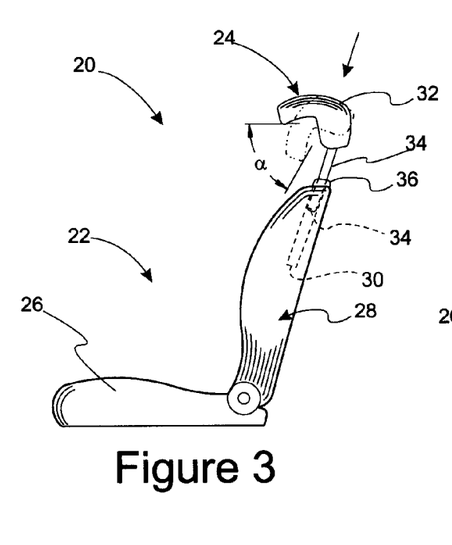
FIG. 3 is a side elevational view of the embodiment shown in FIG. 1 with the head receiving portion in the second or non-operational position.

A person desiring to adjust headrest assembly 24 to a position below the full down position for any reason, including to permit greater visibility out of the rear of a vehicle, or to facilitate storage of vehicle seat assembly 22, must first rotate head receiving portion 32 from a first or operational position to a second or non-operational position. This is best illustrated in FIG. 3. In FIG. 3, head receiving portion 32 is depicted in both phantom lines and solid lines. The phantom lines correspond with the first position while the solid line corresponds with the second position. Also depicted in FIG. 3 are broken lines drawn through a forward portion of the head receiving portion 32 for the purpose of illustrating the angle of rotation of head receiving portion 32 between the first position and the second position. The angle of rotation between the first position and the second position is represented by angle alpha. Angle alpha may be any angle that permits headrest assembly 24 to clear the obstruction caused by seat back assembly 28, which in turn permits further downward adjustment of headrest assembly 24. In at least one embodiment, angle alpha is at least 60 degrees. In other embodiments, angle alpha may be approximately 60 degrees. In still other embodiments, angle alpha may be not greater than 60 degrees.

In the embodiment illustrated in FIGS. 1 through 5, headrest assembly 24 rotates between the first position and the second position. In other embodiments, headrest assembly 24 may not rotate, but instead may move by any means effective to reposition headrest assembly 24 from the first position to the second position. In at least one embodiment, headrest assembly 24 can include a spring 46 and a first interlock assembly 48 (see FIGS. 7-9) to control movement of the head receiving portion 32 from the first position to the second position. In embodiments of the headrest assembly 24 equipped with the spring 46, the spring 46 can move the head receiving portion 32 from the first position to the second position. In at least one embodiment, the spring 46 can also maintain the head receiving portion 32 in the second position. In embodiments of headrest assembly 24 equipped with the first interlock assembly 48, the first interlock assembly 48 secures the head receiving portion 32 in the first position and inhibits movement of the head receiving portion 32 from the first position to the second position. In such embodiments, when the first interlock assembly 48 is released, the head receiving portion 32 is free to move from the first position to the second position. In embodiments of the headrest assembly 24 equipped with both the spring 46 and the first interlock assembly 48, the spring 46 urges the head receiving portion 32 towards the second position while the first interlock assembly 48 inhibits such movement. In such embodiments, when the first interlock assembly 48 is released, the head receiving portion 32 moves automatically under the urging of the spring 46 from the first position to the second position and is retained in the second position by the spring 46. In at least one embodiment, when the head receiving portion 32 is moved from the second position back to the first position, the first interlock assembly 48 automatically secures the head receiving portion in the first position. In other embodiments, the first interlock assembly 48 may require manual resetting when the head receiving portion 32 is moved into the first position.

As illustrated in FIG. 3, with the head receiving portion 32 in the second position, downward adjustment of headrest assembly 24 beyond the full down position is possible because seat back assembly 28 no longer obstructs such downward adjustment. In embodiments of combination 20 equipped with the second interlock assembly 36, downward adjustment of the headrest assembly 24 below the full down position may be controlled by the second interlock assembly 36 once the headrest assembly 24 is in the second position.

Figure 4:
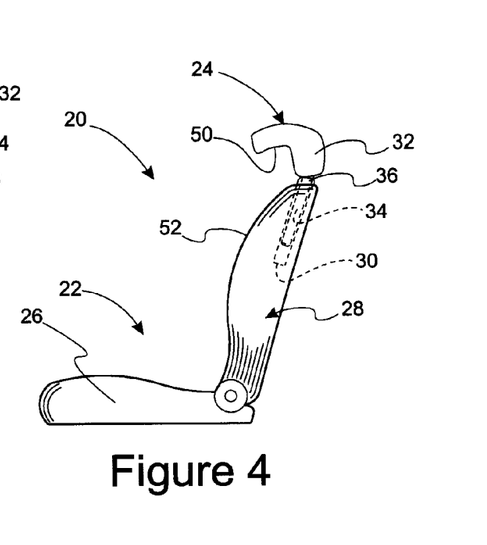
FIG. 4 is a side elevational view of the embodiment shown in FIG. 1 with the headrest assembly adjusted down below the full down position.
Figure 5:
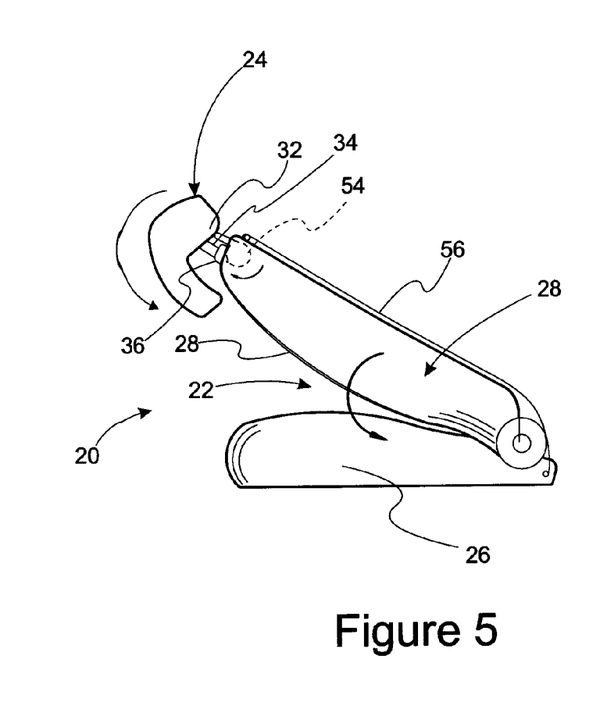
FIG. 5 is a side elevational view of the embodiment shown in FIG. 1 as the vehicle seat back assembly is folded down.

FIG. 4 depicts the headrest assembly 24 adjusted below the full down position. While the headrest assembly 24 is adjusted below the full down position, the head receiving portion 32 is inhibited from returning to the first position by the spring 46. If the head receiving portion 32 is pushed back towards the first position, the head receiving portion 32 will be prevented from fully returning to the first position by contact between a rear portion 50 of the head receiving portion 32 and a front portion 52 of seat back assembly 28 which obstructs the movement of the head receiving portion 32. In the illustrated embodiment, with head receiving portion 32 thus obstructed from movement back to the first position, the first interlock assembly 48 cannot be triggered and cannot retain the head receiving portion 32 in the first position. In the illustrated embodiment, when a person pushing against the head receiving portion 32 releases head receiving portion 32, head receiving portion 32 will return to the second position under the urging of the spring 46.

With head receiving portion 32 in the second position, the head rest assembly 24 is in a non-operational configuration which would be apparent to anyone desiring to sit in vehicle seat assembly 22. Anyone viewing headrest assembly 24 in this configuration would therefore know not to sit in vehicle seat assembly 22. To make vehicle seat assembly 22 usable to an occupant, that occupant would first have to raise headrest assembly 24 back to at least the full down position in order to allow head receiving portion 32 to move back to the first position without any obstruction from the front portion 52 of the seat back assembly 28. Once the head receiving portion 32 has been returned to the first position, the first interlock assembly can secure the head receiving portion 32 and the vehicle seat assembly 22 can be occupied.

When the headrest assembly 24 is adjusted to below the full down position, the vehicle seat assembly 22 can be folded and stored. However, with the head receiving portion 32 in the second position, bottom portion 38 of the head receiving portion 32 may come into contact with seat bottom 26 as seat back assembly 28 is folded down, thereby obstructing seat back assembly 28 from folding. Therefore, in at least one embodiment of the present invention, the seat back assembly 28 includes a motion inducing member 54 that causes head receiving portion 32 to move back towards the first position as the seat back assembly 28 is folded down. In the embodiment illustrated in FIG. 5, motion inducing member 54 rotates in the clockwise direction with respect to seat back assembly 28 as seat back assembly 28 is folded. As motion inducing member 54 rotates clockwise, it comes into contact with head receiving portion 32 and exerts a force sufficient to at least partially overcome the force exerted by the spring 46 urging the head receiving portion 32 towards the second position. In this manner, the motion inducing member 54 causes the head receiving portion 32 to rotate towards the first position, thus obviating the obstruction that might otherwise be caused if the head receiving portion 32 remained in the second position as the seat back assembly 28 was folded down. In the embodiment depicted in FIG. 5, a cable 56 is attached to the motion inducing member 54. In the illustrated embodiment, the cable 56 is also anchored to the seat bottom 26 which remains stationary with respect to the seat back assembly 28 as the seat back assembly 28 is folded down. In other embodiments, the cable 56 may be anchored to any other part of the vehicle seat assembly 22 that remains stationary with respect to the seat back assembly 28 as the seat back assembly 28 is folded. Alternatively, the cable 56 may be anchored to any structure that remains stationary with respect to the seat back assembly 28 as the seat back assembly 28 is folded. In other embodiments, the cable 56 may be anchored to any other structure or device effective to pull on, or increase the tension in cable 56 as the seat back assembly 28 is folded. The increasing tension in cable 56 is communicated to the motion inducing member 54, causing the motion inducing member 54 to move and come into contact with the head receiving portion 32, thus causing the head receiving portion 32 to move towards the first position. In the illustrated embodiment, when the seat back assembly 28 is returned to its upright position, the tension on the cable 56 is released and the head receiving portion 32 is free to return to the second position under the urging of the spring 46.

Figure 6:
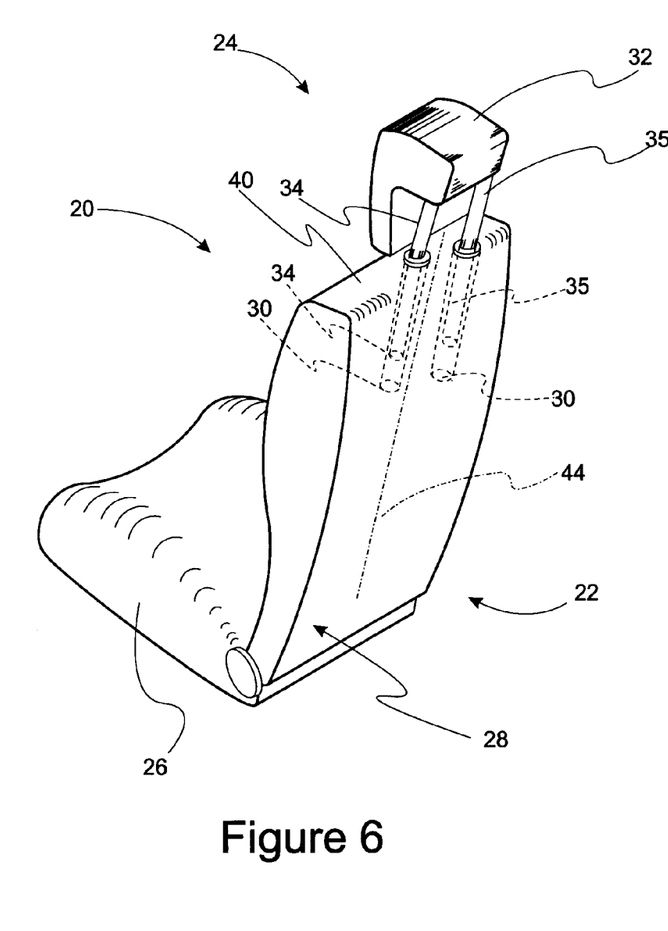
FIG. 6 is a rear perspective view of the combination of the present invention.

In at least one embodiment, the headrest assembly 24 includes a second connecting post 35 to facilitate connection of the headrest assembly 24 to seat back assembly 28. This is best illustrated in FIG. 6. As illustrated in FIG. 6, seat back assembly 28 has two cavities 30 (depicted in phantom lines) to accommodate the two connecting posts 34, 35.

Figure 7:
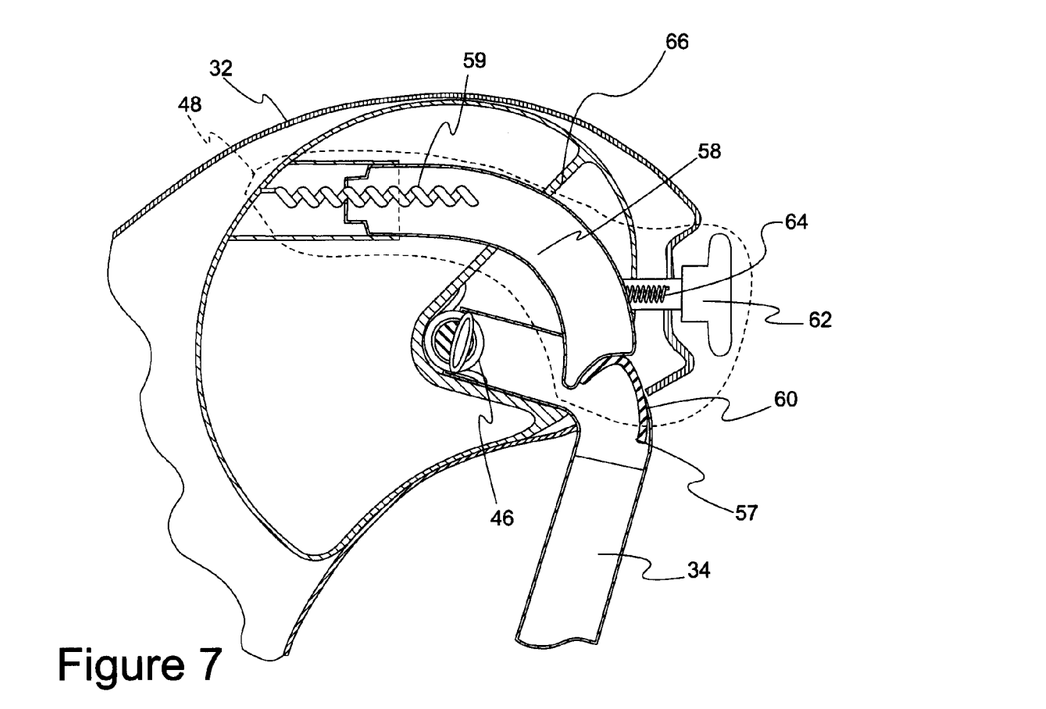
FIG. 7 is a cutaway side elevational view of an embodiment of a headrest assembly of the present invention with the head receiving portion in the first position.
Figure 8:
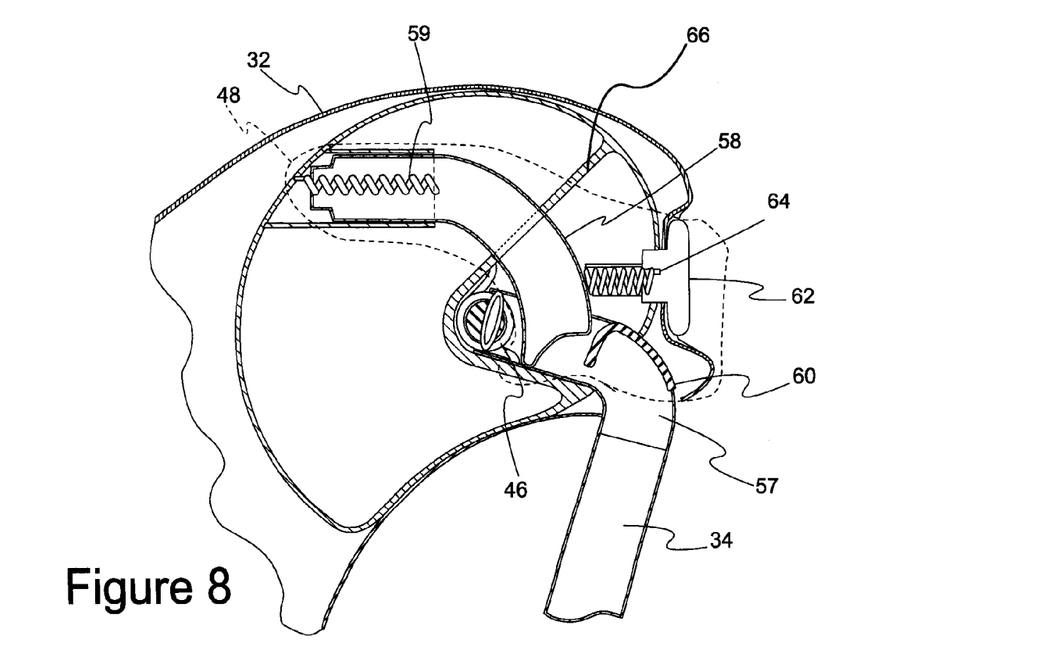
FIG. 8 is a cutaway side elevational view of the embodiment of the headrest assembly shown in FIG. 7 with the first interlock assembly released.
Figure 9:
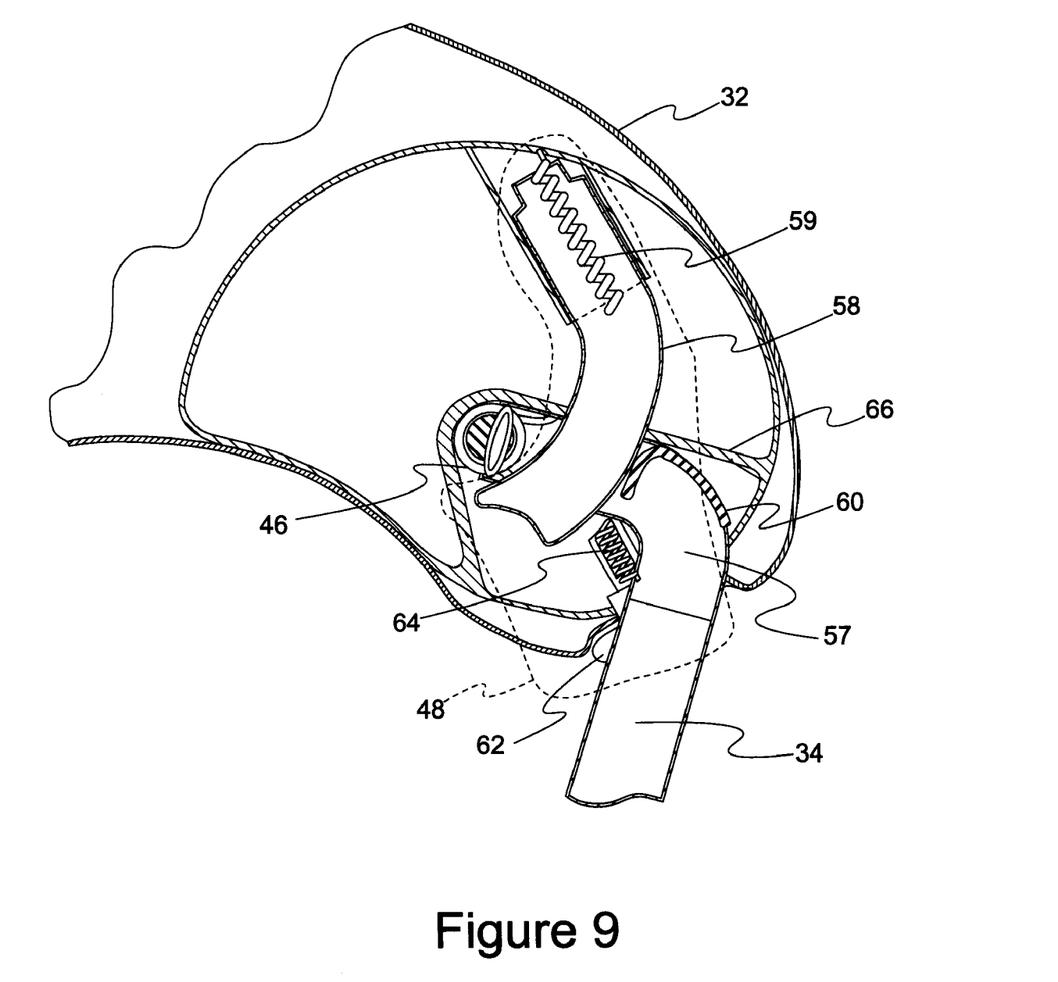
FIG. 9 is a cutaway side elevational view of the embodiment of the headrest assembly shown in FIG. 7 with the head receiving portion in the second position.

FIGS. 7 through 9 depict the operation of at least one embodiment of the first interlock assembly 48. In FIG. 7, an embodiment of the headrest assembly 24 is depicted in the first position. The cutaway reveals an embodiment of the first interlock assembly 48. As shown in FIG. 7, a connecting member 57 is mounted to a top portion of connecting post 34. In the illustrated embodiment, connecting member 57 does not move with respect to connecting post 34. In the embodiment illustrated in FIGS. 7 through 9, head receiving portion 32 rotates about connecting member 57 as head receiving portion 32 moves between the first position and the second position. In the illustrated embodiment, a motion prevention member 58 is mounted to the head receiving portion 32. The motion prevention member 58 is configured to move between an extended position and a retracted position. Motion prevention member spring 59 is connected to motion prevention member 58 and urges motion prevention member 58 towards the extended position. In the illustrated embodiment, an obstruction member 60 is mounted to the connecting member 57. As illustrated in FIGS. 7 through 9, the obstruction member 60 can rotate fore and aft with respect to connecting member 57. In other embodiments, obstruction member 60 may be stationary.

As illustrated in FIG. 7, when the motion prevention member 58 is in the extended position, it contacts obstruction member 60. In this position, motion prevention member 58 and obstruction member 60 cooperate to prevent head receiving portion 32 from rotating from the first position to the second position.

The first interlock assembly 48 also includes a release member 62 and a release member spring 64. In this embodiment, the release member 62 is mounted to the head receiving portion 32 and configured for movement with respect to the head receiving portion 32 between a fore position and an aft position. In the illustrated embodiment, the release member spring 64 urges release member 62 towards the aft position. As illustrated in FIG. 7, release member 62 is mounted in close proximity to motion prevention member 58. In other embodiments, release member 62 may be mounted so that it is in contact with motion prevention member 58. When release member 62 is pushed to the fore position, it pushes motion prevention member 58 towards the retracted position. As motion prevention member 58 moves towards the retracted position, motion prevention member 58 simultaneously moves out of contact with obstruction member 60. This is illustrated in FIG. 8. Once the motion prevention member 58 is in the retracted position and out of contact with obstruction member 60, head receiving portion 32 is free to rotate about connecting member 57 and is urged to do so by spring 46. The embodiment of the headrest assembly 24 illustrated in FIGS. 7 through 9 includes a rotation stopping member 66. Rotation stopping member 66 makes contact with connecting member 57 to prevent further rotation of the head receiving portion 32 beyond the second position. This is best illustrated in FIG. 9.

FIG. 9 depicts the head receiving portion 32 in the second position. In this configuration, the motion prevention member 58 is retained in the retracted position and is obstructed from returning to the extended position by obstruction member 60. When the head receiving portion 32 is pushed back to the first position, the motion prevention member 58 will rotate past obstruction member 60 at which point the motion prevention member 58 may return to the extended position. In the illustrated embodiment, the motion prevention member spring 59 urges the motion prevention member 58 towards the extended position such that when the head receiving portion 32 is pushed back to the first position, the motion prevention member 58 returns automatically to its extended position and engages the obstruction member 60, thus securing the head receiving portion 32 into the first position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A headrest assembly in combination with a vehicle seat assembly, the combination comprising:
   a vehicle seat assembly having a seat bottom and a seat back assembly connected to the seat bottom, the seat back assembly being configured to be folded down on top of the seat bottom, the seat back assembly including a motion inducing member; and
   a headrest assembly connected to the seat back assembly, the headrest assembly having a head receiving portion that is configured for movement between a first position and a second position with respect to the seat back assembly,
   the seat back assembly obstructing downward adjustment of the headrest assembly below a predetermined height when the head receiving portion is in the first position,
   the headrest assembly being downwardly adjustable below the predetermined height when the head receiving portion is in the second position, and
   the motion inducing member being configured to at least partially move the head receiving portion towards the first position as the seat back is folded down.

2. The combination of claim 1 wherein the head receiving portion rotates at least 60 degrees when moving between the first position and the second position.

3. The combination of claim 1 wherein the seat back assembly obstructs the head receiving portion from returning to the first position while the headrest assembly is below the predetermined height.

4. The combination of claim 1 wherein the headrest assembly further comprises:
   a spring connected to the head receiving portion, the spring urging the head receiving portion towards the second position; and
   a first interlock assembly connected to the head receiving portion, the first interlock assembly being capable of locking the head receiving portion in the first position, and the spring moving the head receiving portion to the second position and retaining the head receiving portion in the second position whenever the head receiving portion is not locked in the first position by the first interlock assembly.

5. The combination of claim 4 wherein the headrest assembly is adjustable up and down with respect to the seat back assembly and wherein the combination further comprises a second interlock assembly attached to either the headrest assembly or the vehicle seat assembly for controlling up and down adjustment of the headrest assembly.

6. The combination of claim 1 wherein the vehicle seat assembly further comprises a cable attached to the motion inducing member to cause the motion inducing member to move as the seat back assembly is folded down.

7. The combination of claim 1 wherein the first interlock assembly automatically locks the head receiving portion in the first position when the head receiving portion is moved to the first position.

8. A headrest assembly for use with a vehicle seat assembly having a seat bottom, a seat back assembly attached to the seat bottom, the seat back assembly being adapted to receive the headrest assembly and configured to be folded down on top of the seat bottom, the seat back assembly having a motion inducing member having, the headrest assembly comprising:
   a connecting post configured for connection to the seat back assembly;
   a head receiving portion connected to the connecting post and configured for movement with respect to the connecting post between an operational position and a non-operational position;
   a spring connected to the head receiving portion urging the head receiving portion towards the non-operational position; and
   a first interlock assembly associated with the head receiving portion for retaining the head receiving portion in the operational position,
   the head receiving portion automatically moving towards the non-operational position when the first interlock assembly is released the head receiving portion being configured such that when the connecting post is received within the seat back assembly and when the head receiving portion is in the operational position, the head receiving portion cooperates with the seat back assembly to inhibit downward adjustment below a predetermined height and the head receiving portion configured to at least partially move towards the operational position under urging by the motion inducing member as the back assembly is folded down on top of the seat bottom.

9. The headrest assembly of claim 8 wherein, when the connecting post is received within the seat back assembly and when the head receiving portion is in the non-operational position and when the headrest assembly is below a predetermined height, the head receiving portion cooperates with the seat back assembly to inhibit the head receiving portion from returning to the operational position.

10. The headrest assembly of claim 8 wherein the operational position and the non-operational position are separated by approximately 60 degrees of rotation.

11. The headrest assembly of claim 8 further comprising a second connecting post configured for connection to the seat back assembly and movably connected to the head receiving portion.

12. The headrest assembly of claim 8 wherein the interlock assembly automatically locks the head receiving portion in the operational position when the head receiving portion is moved into the operational position.

13. A headrest assembly in combination with a vehicle seat assembly, the combination comprising:
   a vehicle seat assembly having a seat bottom and a seat back assembly connected to the seat bottom, the seat back assembly having a longitudinal axis, a top portion and two cavities disposed along the top portion; and the seat back assembly being configured to be folded down on top of the seat bottom, the seat back assembly including a motion inducing member; and
   a headrest assembly connected to the seat back assembly, the headrest assembly having a head receiving portion, two connecting posts, a connecting member, a first interlock assembly, and a spring,
   the two connecting posts being received within the two cavities,
   the connecting member being connected to the two connecting posts proximate a top portion of the two connecting posts,
   the head receiving portion being rotatably connected to the connecting member and configured for movement with respect to the two connecting posts between an operational position and a non-operational position that is substantially out of alignment with the longitudinal axis of the seat back assembly, the first interlock assembly being connected to the head rest assembly and being configured to automatically lock the head receiving portion in the operational position whenever the head receiving portion is moved into the operational position, the first interlock assembly inhibiting movement of the head receiving portion to the non-operational position, the spring being connected to the head receiving portion and urging the head receiving portion towards the non-operational position such that the head receiving portion moves automatically to the non-operational position and is retained in the non-operational position by the spring whenever the head receiving portion is not locked in the first position by the first interlock assembly, the headrest assembly and the seat back assembly cooperating to inhibit the headrest assembly from being lowered to less than a predetermined distance from the seat bottom measured along the longitudinal axis of the seat back assembly when the head receiving portion is in the operational position, the headrest assembly being lowerable to less than the predetermined distance from the seat bottom when the head receiving portion is in the non-operational position, and the head receiving portion being inhibited by the seatback assembly from returning to the operational position when the head rest assembly is less than the predetermined distance from the seat bottom, and the motion inducing member being configured to at least partially move the head receiving portion towards the first position as the seat back is folded down.

14. The combination of claim 13 wherein the first interlock assembly comprises:

a motion prevention member mounted to the head receiving portion and configured for movement with respect to the head receiving portion between an extended position and a retracted position;

a motion prevention member spring urging the motion prevention member towards the extended position;

an obstruction member mounted to the connecting member, the obstruction member cooperating with the motion prevention member to inhibit movement of the head receiving portion from the operational position to the non-operational position when the motion prevention member is in the extended position;

a release member mounted to the head receiving portion and configured for movement with respect to the head receiving portion between a fore position and an aft position; and a release member spring mounted to the release member to urge the release member towards the aft position, the release member moving the motion prevention member to the retracted position when the release member is moved to the fore position, the obstruction member being dimensioned and positioned to allow the motion prevention member to move past the obstruction member when the motion prevention member is in the retracted position thereby allowing the head receiving portion to move from the operational position to the non-operational position, the obstruction member inhibiting the motion prevention member from returning to the extended position while the head receiving portion is out of the operational position, and the motion prevention member spring causing the motion prevention member to return automatically to the extended position when the head receiving portion is returned to the operational position.

15. The combination of claim 13 wherein the seatback assembly can be folded down to a position that is substantially parallel to the seat bottom.

16. The combination of claim 13 wherein the vehicle seat assembly further comprises a cable attached to the motion inducing member to cause the motion inducing member to move into contact with the head receiving portion as the seatback assembly is folded down, thereby urging the head receiving portion towards the operational position as the seatback assembly is folded down.

17. The combination of claim 13 wherein the headrest assembly is adjustable with respect to the seatback assembly in a direction substantially parallel to the longitudinal axis of the seatback assembly between a maximum distance from the seat bottom and the predetermined distance from the seat bottom.

18. The combination of claim 13 wherein the head receiving portion rotates about the connecting member at least 60 degrees when moving between the operational position and the non-operational position.

19. The combination of claim 18 wherein the headrest assembly further includes a rotation stopping member to inhibit the head receiving portion from rotating beyond 60 degrees when moving from the operational position to the non-operational position.

* * * * *

UNITED STATES PATENT AND TRADEMARK OFFICE
CERTIFICATE OF CORRECTION

PATENT NO. : 7,517,009 B2
APPLICATION NO. : 11/470384
DATED : April 14, 2009
INVENTOR(S) : Andre Mauro et al.

Page 1 of 1

It is certified that error appears in the above-identified patent and that said Letters Patent is hereby corrected as shown below:

Column 10, Line 26, Claim 8:

Before "back" insert -- seat --.

Column 10, Line 51, Claim 13:

Replace "; and" with ",".

Signed and Sealed this

Twenty-third Day of June, 2009

JOHN DOLL
*Acting Director of the United States Patent and Trademark Office*